(12) United States Patent
Liao et al.

(10) Patent No.: US 12,233,451 B2
(45) Date of Patent: Feb. 25, 2025

(54) ROTARY CABLE ARRANGING TOOL

(71) Applicant: Hanlong Industrial Co., Ltd., New Taipei (TW)

(72) Inventors: Chien-Chou Liao, New Taipei (TW); Mei-Fang Lin, New Taipei (TW)

(73) Assignee: Hanlong Industrial Co., Ltd., New Taipei (TW)

( * ) Notice: Subject to any disclaimer, the term of this patent is extended or adjusted under 35 U.S.C. 154(b) by 285 days.

(21) Appl. No.: 18/163,958

(22) Filed: Feb. 3, 2023

(65) Prior Publication Data
US 2024/0075514 A1 Mar. 7, 2024

(30) Foreign Application Priority Data
Sep. 6, 2022 (TW) ................................ 111133770

(51) Int. Cl.
*B21F 1/00* (2006.01)
*B21F 11/00* (2006.01)

(52) U.S. Cl.
CPC .............. *B21F 1/002* (2013.01); *B21F 11/00* (2013.01)

(58) Field of Classification Search
CPC .......... B21F 1/002; B21F 1/001; B21F 1/006; B21F 1/008; B21F 1/023; B21F 7/00; B21F 1/02; B21F 15/04; H02G 1/1292; H01R 43/28
See application file for complete search history.

(56) References Cited

U.S. PATENT DOCUMENTS 3,590,391 A * 7/1971 Winegar ................... B21F 7/00 140/120
2022/0388054 A1* 12/2022 Chang .................... H01R 43/28

\* cited by examiner

*Primary Examiner* — Debra M Sullivan
(74) *Attorney, Agent, or Firm* — Best & Flanagan LLP (57) ABSTRACT

A rotary cable arranging tool is disclosed. The rotary cable arranging tool is used for untwisting a first and a second cable. The rotary cable arranging tool includes a first annular structure, a first and a second assembly member, and a first and a second hole. The first and the second holes are assembled by the cooperation of the first and the second assemblies so as to be pressed to change a width of an inner diameter. When the first and second cables are in a twisted state, the first and second assemblies are counter-rotated together, so that the first and the second cables are untwisted and enter the first and second holes respectively. Then the first and second holes are tightly combined with the first and second cables, and the first and the second cable are pulled out to be straightened.

16 Claims, 7 Drawing Sheets

ROTARY CABLE ARRANGING TOOL

BACKGROUND OF THE INVENTION

1. Field of the Invention

The present invention relates to a rotary cable arranging tool, and more particularly, to a rotary cable arranging tool that can easily untwist twisted cables.

2. Description of the Related Art

A twisted pair is a type of spiral-looking cable formed by twisting and intertwining two mutually insulated cables covered by an insulating material such as plastic on the outside and containing copper cables on the inside. The twisted pair is capable of reducing attenuation, crosstalk and noise in signals during transmission, as well as improving the suppression of external electromagnetic interference. However, the twisted cables of the twisted pair first need to be untwisted in order to be connected to a connector. This process is performed at the cost of many procedures and causes complications to engineering staff.

Therefore, there is a need for a novel rotary cable arranging tool to solve the drawbacks of the prior art.

SUMMARY OF THE INVENTION

It is the primary object of the present application to provide a rotary cable arranging tool capable of untwisting twisted cables easily.

To achieve the above object, a rotary cable arranging tool of the present invention is used for untwisting a first cable and a second cable twisted with each other. The rotary cable arranging tool comprises a first annular structure, a first assembly member, a second assembly member, a first hole, and a second hole. The first assembly member and the second assembly member are jointly pivoted to the first annular structure, so that the first assembly member and the second assembly member can be rotated relative to the first annular structure. The second hole is adjacent to the first hole; wherein the first hole and the second hole are assembled by the cooperation of the first assembly member and the second assembly member; the first hole and the second hole can be pressed to change a width of an inner diameter. When the first cable and second cable are in a twisted state, the first assembly member and second assembly member are counter-rotated together, so that the first cable and the second cable are untwisted and enter the first hole and second hole respectively; after the first cable and the second cable enter the first hole and the second hole and reach a predetermined length, the first assembly member and the second assembly member are pressed so that the first hole and the second hole are tightly combined with the first cable and the second cable, and the first cable and the second cable are pulled out such that the first cable and the second cable are straightened.

DETAILED DESCRIPTION OF THE PREFERRED EMBODIMENTS

The advantages and innovative features of the invention will become more apparent from the following detailed descriptions when taken in conjunction with the accompanying drawings.

Figure 1:
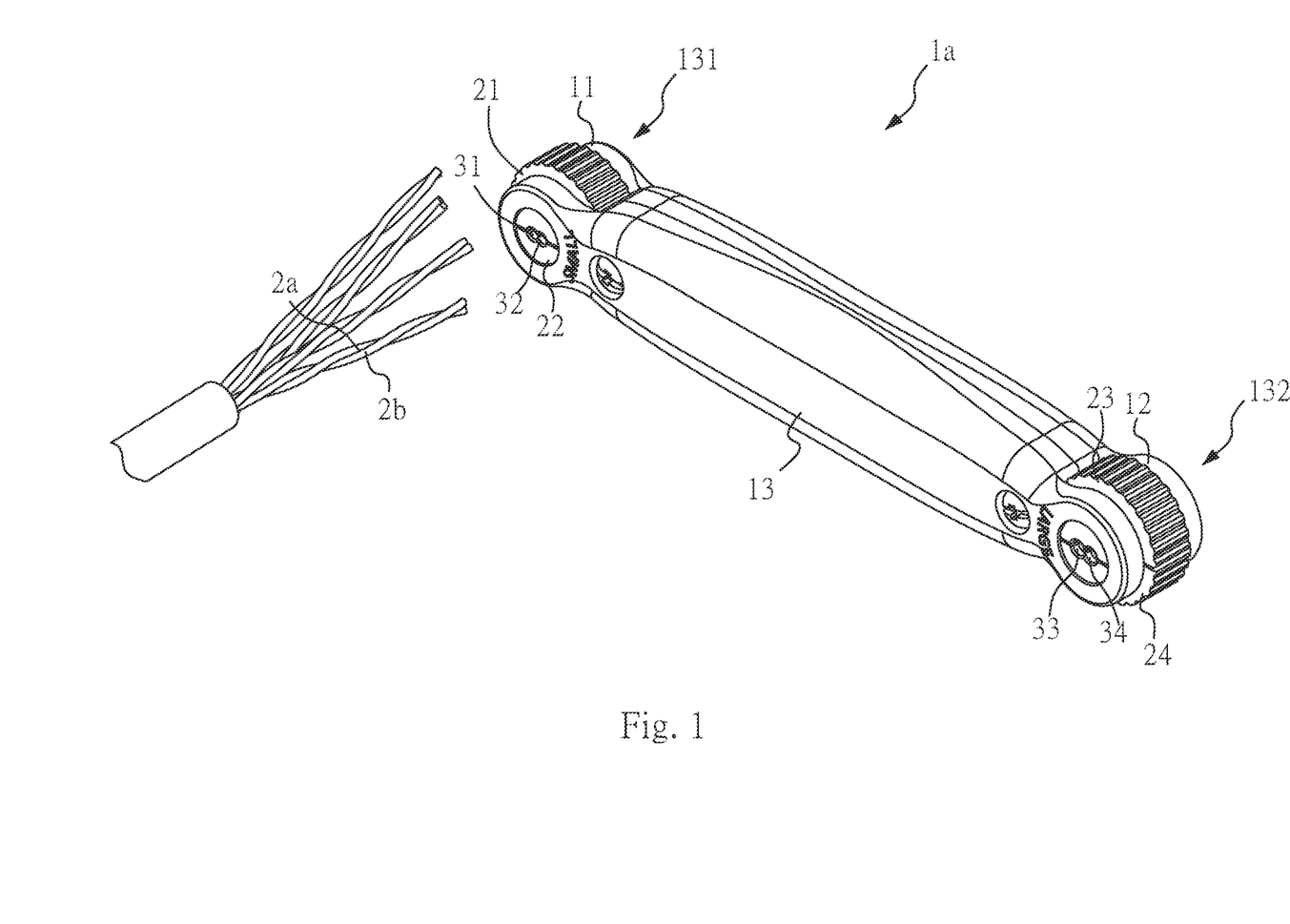
FIG. 1 illustrates a schematic view of the appearance of a rotary cable arranging tool of a first embodiment of the present invention.

Please refer to FIG. 1 for a schematic view of the appearance of a rotary cable arranging tool of a first embodiment of the present invention.

In the first embodiment of the present invention, the rotary cable arranging tool 1a is used for untwisting a first cable 2a and a second cable 2b twisted with each other. The rotary cable arranging tool 1a includes a first annular structure 11, a first assembly member 21, a second assembly member 22, a first hole 31, and a second hole 32. The first annular structure 11 can be connected to a first end 131 of a grip handle 13, but the present invention is not limited thereto, when the first annular structure 11 is not connected to the grip handle 13, it still can achieve the effect of the present invention. The first assembly member 21 and the second assembly member 22 are jointly pivoted to the first annular structure 11, so that the first assembly member 21 and the second assembly member 22 can be rotated relative to the first annular structure 11. Both the first assembly member 21 and the second assembly member 22 can be in the shape of a semicircle, and the two can cooperate with each other to form a circular shape, and can form the first hole 31 and the second hole 32 adjacent to each other on the inside. The first hole 31 and the second hole 32 are used for receiving the first cable 2a and the second cable 2b. Therefore, the angle at which the first cable 2a and the second cable 2b are inserted into the first hole 31 and the second hole 32 is perpendicular to the grip handle 13.

In the first embodiment of the present invention, the second end 132 of the grip handle 13 can also be connected to the second annular structure 12. The third assembly member 23 and the fourth assembly member 24 are jointly pivoted to the second annular structure 12 to rotate, the third assembly member 23 and the fourth assembly member 24 are assembled with each other to obtain a third hole 33 and a fourth hole 34 adjacent to each other. The inner diameters of the first hole 31 and the second hole 32 are smaller than the inner diameters of the third hole 33 and the fourth hole 34, but the present invention is not limited thereto.

Figure 2:
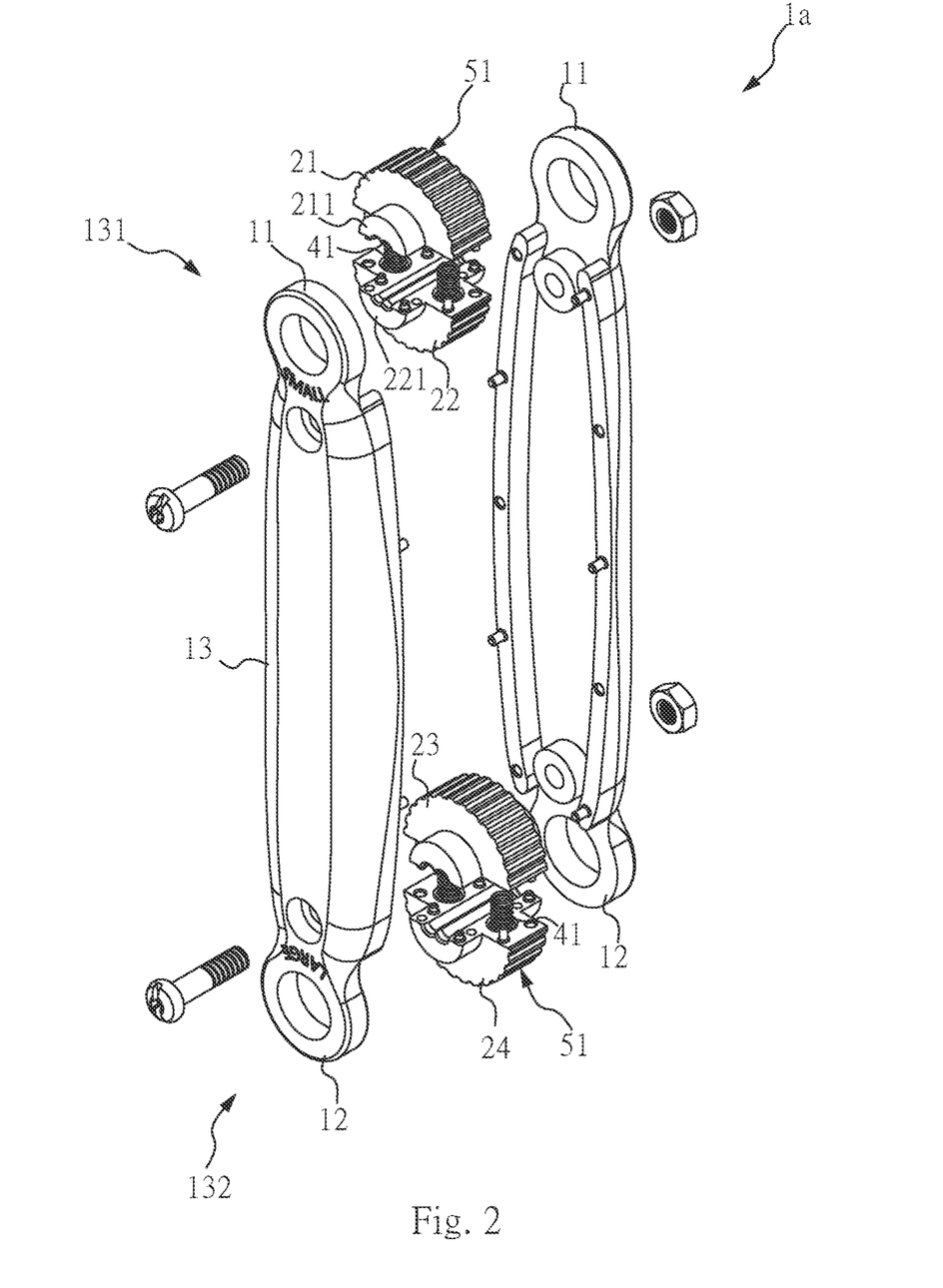
FIG. 2 illustrates an exploded view of the rotary cable arranging tool of the first embodiment of the present invention.

Next, please refer to FIG. 2 for an exploded view of the rotary cable arranging tool of the first embodiment of the present invention.

In the first embodiment of the present invention, one side or both sides of the first assembly member 21 can be connected to a first protruding portion 211, and one side or both sides of the second assembly member 22 can also be connected to a second protruding portion 221, the first assembly member 21 and the second assembly member 22 are pivotally connected to the first annular structure 11 through the protruding portion 211 and the protruding portion 221, so that the first assembly member 21 and the second assembly member 22 can be rotated relative to the first annular structure 11. The third assembly member 23 and the fourth assembly member 24 can also have the same structure, so it will not be further described here. In addition, an elastic member 41 may also be provided between the first assembly member 21 and the second assembly member 22. When the first assembly member 21 and the second assembly member 22 are pressed, the elastic member 41 can provide a restoring elastic force, so that the first assembly member 21 and the second assembly member 22 can be restored to the circular shape. The way in which the first assembly member 21 and the second assembly member 22 are pivotally connected to the first annular structure 11 in FIG. 2 is only for illustration, and the present invention is not limited to this structure.

Please refer to FIGS. 3A-3D for schematic views of continuous actions of the rotary cable arranging tool of the first embodiment of the present invention.

Figure 3A:
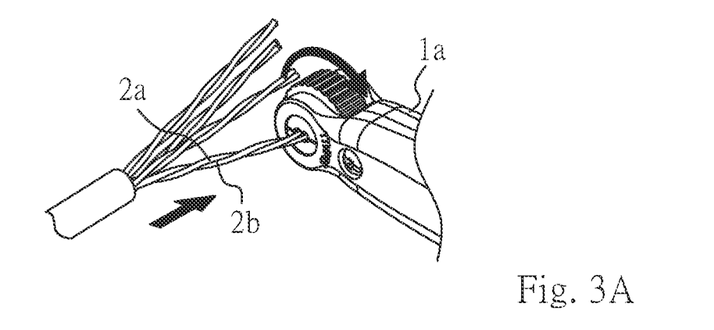
FIGS. 3A-3D are schematic views of continuous actions of the rotary cable arranging tool of the first embodiment of the present invention.
Figure 3B:
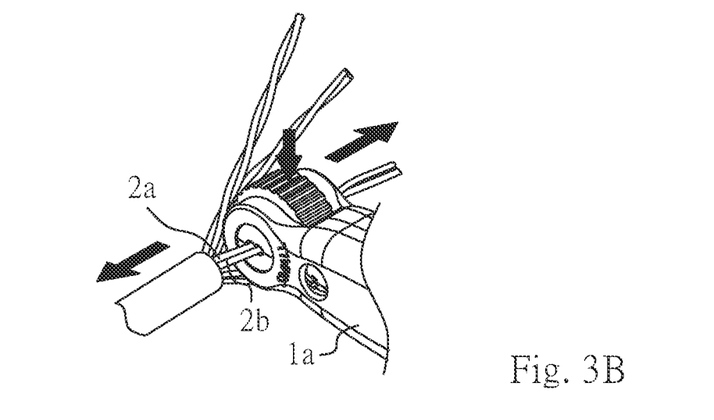
Figure 3C:
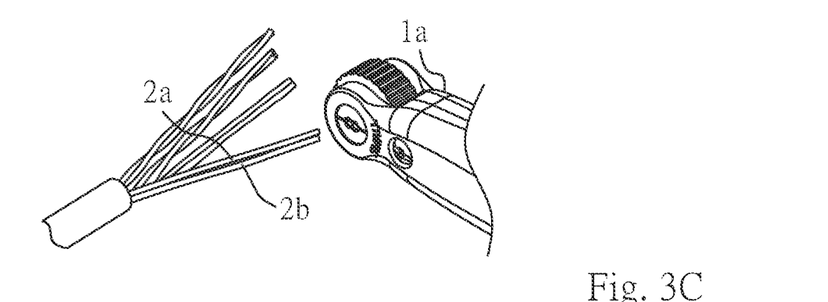
Figure 3D:
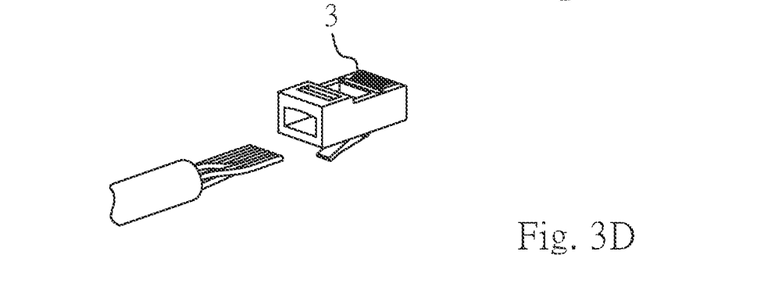

Therefore, when the first cable 2a and the second cable 2b are rotated and wound, the first assembly member 21 and the second assembly member 22 are counter-rotated together, so that the first cable 2a and the second cable 2b can be untwisted and enter the first hole 31 and the second hole 32 respectively (as shown in FIG. 3A). The counter direction here refers to the winding direction opposite to that of the first cable 2a and the second cable 2b. After the first cable 2a and the second cable 2b enter the first hole 31 and the second hole 32 and reach a predetermined length, the first assembly member 21 and the second assembly member 22 are pressed so that the first hole 31 and the second hole 32 are tightly combined with the first cable 2a and the second cable 2b (as shown in FIG. 3B). At this time, if only the first assembly member 21 or the second assembly member 22 is pressed, the diameters of the first hole 31 and the second hole 32 can also be reduced. Finally, by pulling out the rotary cable arranging tool 1a (as shown in FIG. 3C), the first cable 2a and the second cable 2b are straightened to facilitate subsequent processing. In this way, the first cable 2a and the second cable 2b can be installed to another port 3 (as shown in FIG. 3D).

Figure 4:
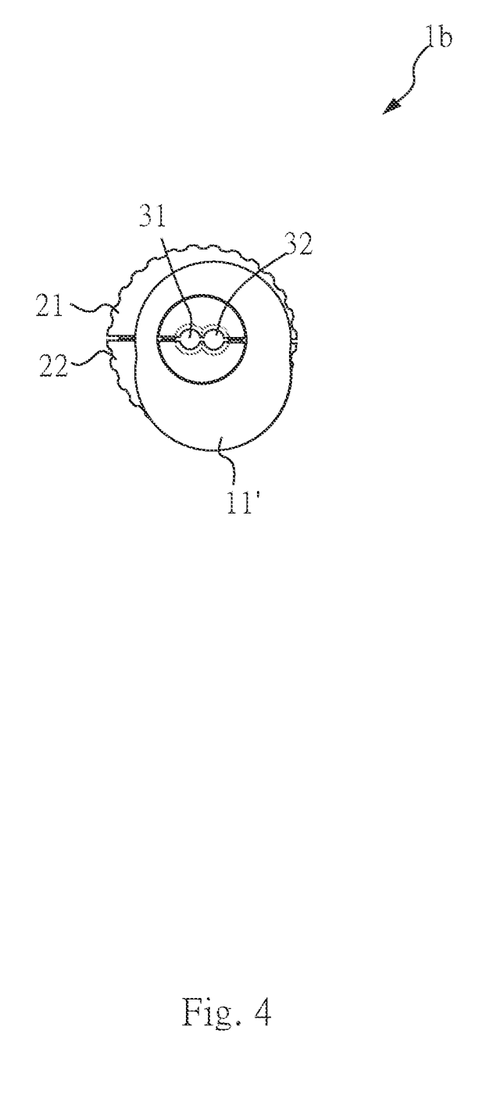
FIG. 4 illustrates a side view of the rotary cable arranging tool of a second embodiment of the present invention.

Next, please refer to FIG. 4 for a side view of the rotary cable arranging tool of a second embodiment of the present invention.

In the second embodiment of the present invention, after the first assembly member 21 and the second assembly member 22 of the rotary cable arranging tool 1b are combined, they are not pivotally connected to the center of the first annular structure 11'. The first annular structure 11' is not a perfect circle, but rather an ellipse. The present invention is not limited to any particular shape of the first annular structure 11', as long as the first assembly member 21 and the second assembly member 22 can rotate, it falls within the scope of the present invention.

Figure 5:
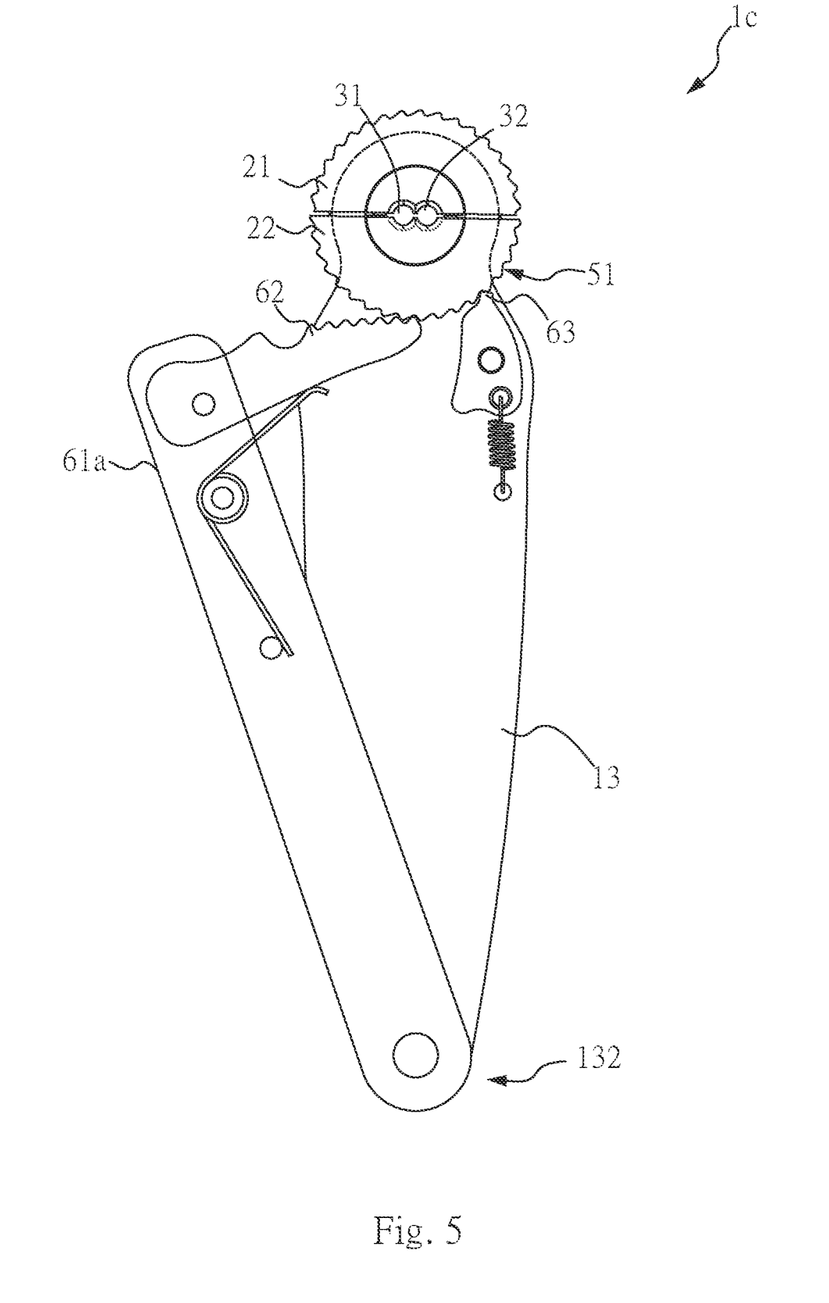
FIG. 5 illustrates a schematic cross-sectional view of a rotary cable arranging tool of a third embodiment of the present invention.

Now please refer to FIG. 5 for a schematic cross-sectional view of a rotary cable arranging tool of a third embodiment of the present invention.

In the third embodiment of the present invention, the inside of the grip handle 13 of the rotary cable arranging tool 1c further includes a pressing handle 61a, a first claw 62 and a second claw 63. The pressing handle 61a is pivotally connected to the second end 132 of the grip handle 13. The first claw 62 is connected to the pressing part 61a and engages with a plurality of tooth-like structures 51, so that when the pressing handle 61a is pressed, the first claw 62 can move the plurality of tooth-like structure 51 one tooth after another, which in turn drives the first assembly member 21 and the second assembly member 22 to rotate. The second claw 63 is used for engaging with the plurality of tooth-like structures 51 so as to abut against the first assembly member 21 and the second assembly member 22. Therefore, when the first claw 62 is not moving, the second claw 63 can prevent the first assembly member 21 and the second assembly member 22 from rotating arbitrarily.

Figure 6:
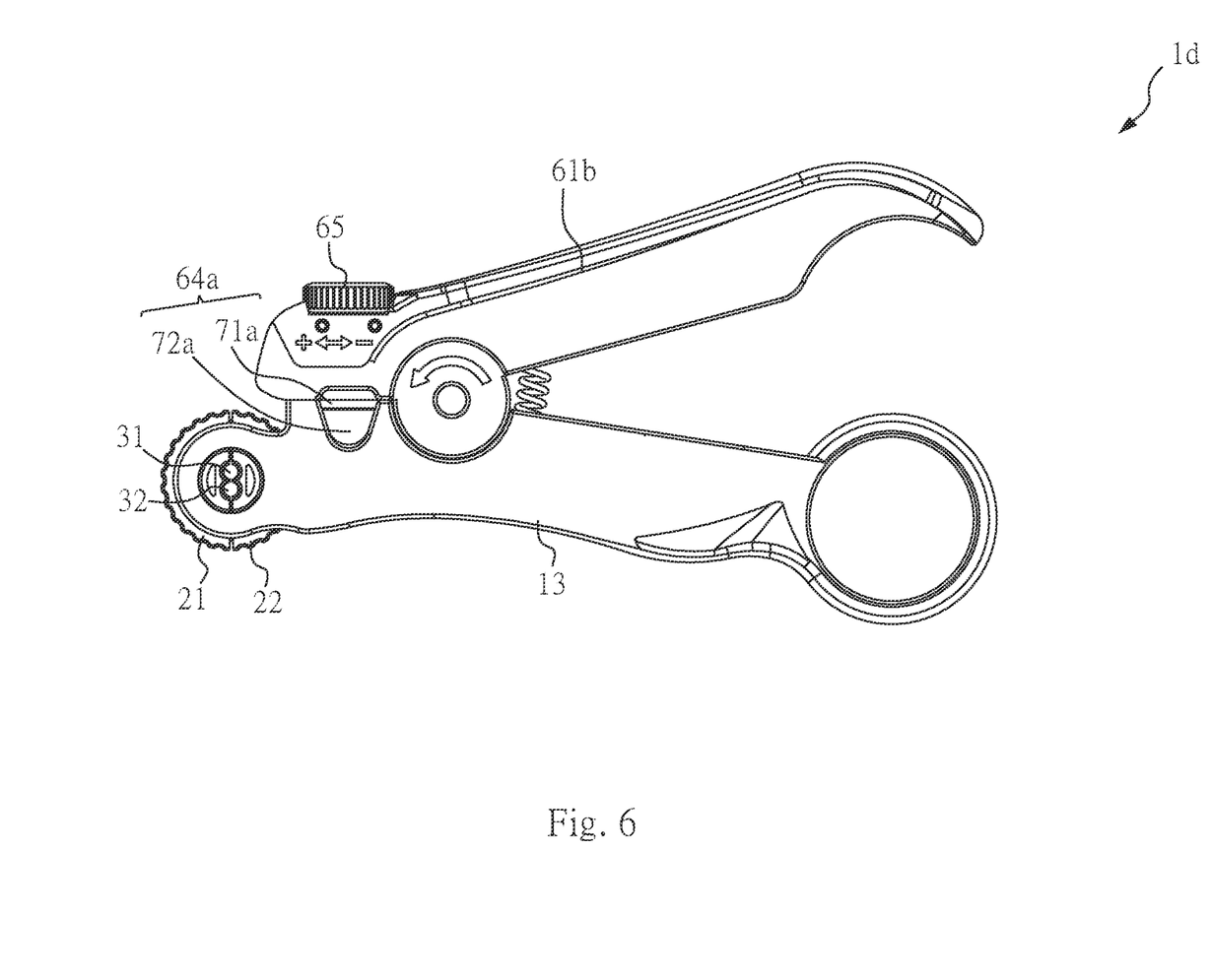
FIG. 6 illustrates a schematic view of the appearance of the rotary cable arranging tool of a fourth embodiment of the present invention.

Please refer to FIG. 6 for a schematic view of the appearance of the rotary cable arranging tool of a fourth embodiment of the present invention.

In the fourth embodiment of the present invention, the rotary cable arranging tool 1d further includes a pressing handle 61b, a wire stripping structure 64a, and an adjusting structure 65. The pressing handle 61b is pivotally connected to the first end 131 of the grip handle 13. The wire stripping structure 64a has a blade 71a and a hole 72a, wherein the blade 71a is connected to the pressing handle 61b and is disposed to pass through the hole 72a. The adjusting structure 65 is used for adjusting a position of the blade 71a to work with wires of different diameters. Therefore, the user can use the blade 71a of the wire stripping structure 64a to first strip off the outer insulation layer of the first cable 2a and the second cable 2b, and then use the first assembly member 21 and the second assembly member 22 to pull out and straighten the first cable 2a and the second cable 2b twisted with each other, thereby achieving the object of peeling and straightening with the same tool.

Figure 7A:
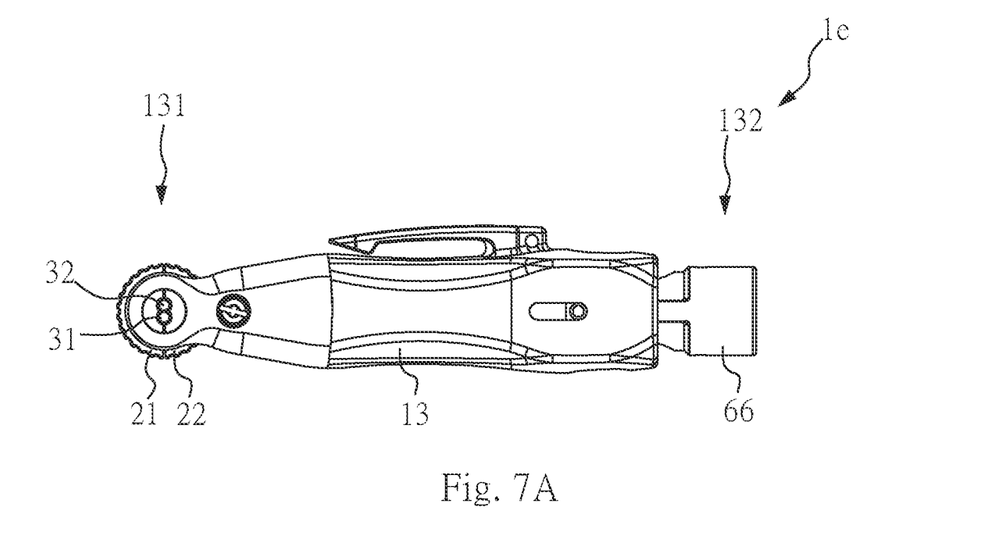
FIG. 7A illustrates a side view of the rotary cable arranging tool on a first side according to a fifth embodiment of the present invention.
Figure 7B:
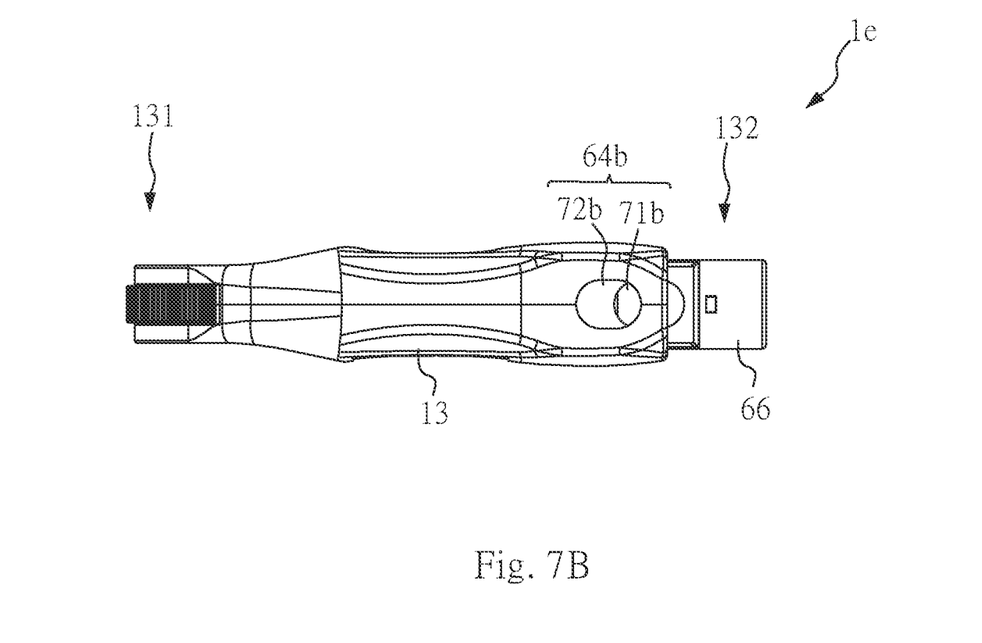
FIG. 7B illustrates a side view of the rotary cable arranging tool on a second side according to the fifth embodiment of the present invention.

Next, please refer to FIG. 7A for a side view of the rotary cable arranging tool on a first side according to a fifth embodiment of the present invention; and FIG. 7B for a side view of the rotary cable arranging tool on a second side according to the fifth embodiment of the present invention.

In the fifth embodiment of the present invention, the rotary cable arranging tool 1e further includes a pressing part 66 and a wire stripping structure 64b. The pressing part 66 is disposed on the second end 132 of the grip handle 13. The wire stripping structure 64b has a blade 71b and a hole 72b, wherein the blade 71b is connected to the pressing part 66 and is disposed to pass through the hole 72b. Therefore, the user can use the blade 71b of the wire stripping structure 64b to first strip off the outer insulation layer of the first cable 2a and the second cable 2b, and then use the first assembly member 21 and the second assembly member 22 to pull out and straighten the first cable 2a and the second cable 2b twisted with each other, thereby achieving the object of peeling and straightening with the same tool.

In addition to the above-mentioned elements, the rotary cable arranging tool 1a, 1b, 1c, 1d, 1e of the present invention can also include other elements. Since the technology of other elements is not the key point of the present invention, it will not be further described here. And the present invention is not limited to the implementation of the above-mentioned rotary cable arranging tool 1a, 1b, 1c, 1d, 1e.

It can be seen from the above description, the rotary cable arranging tool 1a, 1b, 1c, 1d, 1e of the present invention can easily rotate the first cable 2a and the second cable 2b to pull them straight, so it effectively solves the deficiency of the previous technique.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A rotary cable arranging tool for untwisting a first cable and a second cable twisted with each other, the rotary cable arranging tool comprising:
   a first annular structure;
   a first assembly member;
   a second assembly member, wherein the first assembly member and the second assembly member are jointly pivoted to the first annular structure, so that the first assembly member and the second assembly member can be rotated relative to the first annular structure;
   a first hole; and
   a second hole adjacent to the first hole; wherein the first hole and the second hole are assembled by the cooperation of the first assembly member and the second assembly member; the first hole and the second hole can be pressed to change a width of an inner diameter;
   when the first cable and second cable are in a twisted state, the first assembly member and second assembly member are counter-rotated together, so that the first cable and the second cable are untwisted and enter the first hole and second hole respectively; after the first cable and the second cable enter the first hole and the second hole and reach a predetermined length, the first assembly member and the second assembly member are pressed so that the first hole and the second hole are tightly combined with the first cable and the second cable, and the first cable and the second cable are pulled out such that the first cable and the second cable are straightened.

2. The rotary cable arranging tool as claimed in claim 1 further comprising a grip handle, wherein the first annular structure is connected to a first end of the grip handle.

3. The rotary cable arranging tool as claimed in claim 2 further comprising an elastic member disposed between the first assembly member and the second assembly member to provide a restoring elastic force when the first assembly member and the second assembly member are pressed.

4. The rotary cable arranging tool as claimed in claim 2, wherein the first assembly member is connected to a first protruding portion, the second assembly member is connected to a second protruding portion, the first assembly member and the second assembly member are pivotally connected to the first annular structure through the first protruding portion and the second protruding portion.

5. The rotary cable arranging tool as claimed in claim 2, wherein the first assembly member and the second assembly member are each a semi-circular structure.

6. The rotary cable arranging tool as claimed in claim 2, wherein outer edges of the first assembly member and the second assembly member are provided with a plurality of tooth structures.

7. The rotary cable arranging tool as claimed in claim 6 further comprising:
   a pressing handle pivotally connected to a second end of the grip handle; and
   a first claw connected to the pressing handle and engaged with the plurality of tooth structures, so that when the pressing handle is pressed, the first claw can rotate the first assembly member and the second assembly member.

8. The rotary cable arranging tool as claimed in claim 6 further comprising a second claw engaged with the plurality of tooth structures, so as to abut against the first assembly member and the second assembly member.

9. The rotary cable arranging tool as claimed in claim 2 further comprising:
   a pressing handle pivotally connected to a first end of the grip handle;
   a wire stripping structure having a blade and a hole, wherein the blade is connected to the pressing handle and is disposed to pass through the hole; and
   an adjusting structure for adjusting a position of the blade.

10. The rotary cable arranging tool as claimed in claim 2 further comprising:
    a pressing part disposed at a second end of the grip handle; and
    a wire stripping structure having a blade and a hole, wherein the blade is connected to the pressing handle and is disposed to pass through the hole.

11. The rotary cable arranging tool as claimed in claim 2 further comprising:
    a second annular structure connected to the second end of the grip handle;
    a third assembly member;
    a fourth assembly member, wherein the third assembly member and the fourth assembly member are jointly pivoted to the second annular structure, so that the third assembly member and the fourth assembly member can be rotated relative to the second annular structure;
    a third hole; and
    a fourth hole adjacent to the third hole; wherein the third hole and the second hole are assembled by the cooperation of the third assembly member and the fourth assembly member; wherein the third hole and the fourth hole can be pressed to change the width of the inner diameter.

12. The rotary cable arranging tool as claimed in claim 2, wherein an insertion direction of the first cable and the second cable is perpendicular to the grip handle.

13. The rotary cable arranging tool as claimed in claim 1, wherein the first annular structure is formed in a non-circular shape.

14. The rotary cable arranging tool as claimed in claim 1 further comprising an elastic member disposed between the first assembly member and the second assembly member to provide a restoring elastic force when the first assembly member and the second assembly member are pressed.

15. The rotary cable arranging tool as claimed in claim 1, wherein the first assembly member is connected to a first protruding portion, the second assembly member is connected to a second protruding portion, the first assembly member and the second assembly member are pivotally connected to the first annular structure through the first protruding portion and the second protruding portion.

16. The rotary cable arranging tool as claimed in claim 1, wherein the first assembly member and the second assembly member are each a semi-circular structure.

* * * * *